US010552709B2

(12) United States Patent
Fua et al.

(10) Patent No.: US 10,552,709 B2
(45) Date of Patent: Feb. 4, 2020

(54) METHOD, SYSTEM, AND DEVICE FOR LEARNED INVARIANT FEATURE TRANSFORM FOR COMPUTER IMAGES

(71) Applicant: ECOLE POLYTECHNIQUE FEDERALE DE LAUSANNE (EPFL), Lausanne (CH)

(72) Inventors: Pascal Fua, Vaux-sur-Morges (CH); Vincent Lepetit, Graz (AT); Eduard Fortuny Trulls, Lausanne (CH); Kwang Moo Yi, Ecublens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 113 days.

(21) Appl. No.: 15/636,658

(22) Filed: Jun. 29, 2017

(65) Prior Publication Data

US 2018/0096224 A1    Apr. 5, 2018

Related U.S. Application Data

(60) Provisional application No. 62/404,442, filed on Oct. 5, 2016.

(51) Int. Cl.
*G06K 9/46* (2006.01)
*G06K 9/62* (2006.01)
(Continued)

(52) U.S. Cl.
CPC ........... *G06K 9/6217* (2013.01); *G06F 16/51* (2019.01); *G06F 16/5838* (2019.01);
(Continued)

(58) Field of Classification Search
CPC .... G06K 9/00523; G06K 9/3233; G06K 9/46; G06K 9/4604; G06K 9/4623;
(Continued)

(56) References Cited

U.S. PATENT DOCUMENTS 8,737,737 B1 *  5/2014  Feldman .............. G06K 9/4642
                                                                382/168
8,873,838 B2 * 10/2014  Suleyman .......... G06K 9/00362
                                                                382/157

(Continued)

OTHER PUBLICATIONS

Mattis Paulin, Matthijs Douze, Zaid Harchaoui, Julien Mairal, Florent Perronnin and Cordelia Schmid, "Local Convolutional Features with Unsupervised Training for Image Retrieval", HAL archives-ouvertes, hal-01207966, Oct. 2015, pp. 1-9. (Year: 2015).*

(Continued)

*Primary Examiner* — Eric Rush
(74) *Attorney, Agent, or Firm* — Andre Roland S.A.; Nikolaus Schibli

(57) ABSTRACT

A method for training a feature detector of an image processing device, including the steps of detecting features in the image to generate a score map, computing a center of mass on the score map to generate a location, extracting a patch from the image at the location by a first spatial transformer, estimating an orientation of the patch, rotating the patch in accordance with the patch orientation with a second spatial transformer, and describing the rotated patch to create a description vector.

16 Claims, 14 Drawing Sheets

(51) Int. Cl.
    *G06F 16/51*     (2019.01)
    *G06F 16/583*     (2019.01)
    *G06K 9/00*     (2006.01)
    *G06N 3/02*     (2006.01)

(52) U.S. Cl.
    CPC ....... *G06K 9/00523* (2013.01); *G06K 9/4671* (2013.01); *G06K 9/6201* (2013.01); *G06N 3/02* (2013.01)

(58) Field of Classification Search
    CPC .. G06K 9/4628; G06K 9/4671; G06K 9/4676; G06K 9/6201; G06K 9/6202; G06K 9/6203; G06K 9/6211; G06K 9/6215; G06K 9/6217; G06K 9/6228; G06K 9/627; G06K 9/6271; G06K 9/6274; G06K 9/629; G06K 9/66; G06N 3/02; G06N 3/0454; G06T 7/10; G06T 7/11; G06T 7/143; G06T 7/246; G06T 7/248; G06T 7/66; G06T 7/70; G06T 7/73; G06T 7/74; G06T 7/75; G06T 7/97; G06T 2207/20016; G06T 2207/20021; G06T 2207/20081; G06T 2207/20084; G06T 2207/20164; G06T 2207/10012; G06F 16/51; G06F 16/5838
    USPC ....... 382/103, 155, 156, 159, 190, 195, 205, 382/216, 276, 282, 288, 291, 296; 700/47, 48; 706/12, 16, 25, 26, 27, 41, 706/42, 45, 46
    See application file for complete search history.

(56) References Cited

U.S. PATENT DOCUMENTS

| | | | | |
|---|---|---|---|---|
| 9,202,144 | B2* | 12/2015 | Wang | G06K 9/4628 |
| 9,436,895 | B1* | 9/2016 | Jones | G06K 9/6273 |
| 9,514,380 | B2* | 12/2016 | Takacs | G06K 9/46 |
| 9,798,950 | B2* | 10/2017 | Nakashima | G06K 9/4671 |
| 2010/0328462 | A1* | 12/2010 | Chen | G06K 9/00818 382/104 |
| 2012/0011142 | A1* | 1/2012 | Baheti | G06K 9/4671 707/769 |
| 2014/0133742 | A1* | 5/2014 | Xiao | G06K 9/00664 382/159 |
| 2014/0177956 | A1* | 6/2014 | Hummel | G06K 9/4604 382/165 |
| 2015/0278642 | A1* | 10/2015 | Chertok | G06K 9/469 382/156 |
| 2017/0351905 | A1* | 12/2017 | Wang | G06K 9/00241 |
| 2017/0351941 | A1* | 12/2017 | Mishra | G06K 9/4628 |
| 2018/0060649 | A1* | 3/2018 | Kastaniotis | G06K 9/00288 |

OTHER PUBLICATIONS

Junbo Zhao, Michael Mathieu, Ross Goroshin and Yann Lecun, "Stacked What-Where Auto-Encoders", arxiv:1506.02351v5, Nov. 2015, pp. 1-11. (Year: 2015).*
Yannick Verdie, Kwang Moo Yi, Pascal Fua and Vincent Lepetit, "TILDE: A Temporally Invariant Learned Detector", arxiv: 1411.4568v3, Mar. 2015, pp. 1-10. (Year: 2015).*
Pierre Sermanet, Soumith Chintala and Yann LeCun, "Convolutional Neural Networks Applied to House Numbers Digit Classification", IEEE, Proceedings of the 21st International Conference on Pattern Recognition, Nov. 2012, pp. 3288-3291. (Year: 2012).*
Aanæs, H., Dahl, A. L., & Steenstrup Pedersen, K. (2012). Interesting interest points. International Journal of Computer Vision, 97(1), 18-35.
Alahi, A., Ortiz, R., & Vandergheynst, P. (Jun. 2012). Freak: Fast retina keypoint. In Computer vision and pattern recognition (CVPR), 2012 IEEE conference on (pp. 510-517). Ieee.
Alcantarilla, P., Bartoli, A., & Davison, A. (2012). KAZE features. Computer Vision—ECCV 2012, 214-227.
Balntas, V., Johns, E., Tang, L., & Mikolajczyk, K. (2016). PN-Net: conjoined triple deep network for learning local image descriptors. arXiv preprint arXiv:1601.05030.
Bay, H., Ess, A., Tuytelaars, T., & Van Gool, L. (2008). Speeded-up robust features (SURF). Computer vision and image understanding, 110(3), 346-359.
Bellavia, F., Tegolo, D., & Trucco, E. (Aug. 2010). Improving SIFT-based descriptors stability to rotations. In Pattern Recognition (ICPR), 2010 20th International Conference on (pp. 3460-3463). IEEE.
Chapelle, O., & Wu, M. (2010). Gradient descent optimization of smoothed information retrieval metrics. Information retrieval, 13(3), 216-235.
Fan, B., Wu, F., & Hu, Z. (Jun. 2011). Aggregating gradient distributions into intensity orders: A novel local image descriptor. In Computer Vision and Pattern Recognition (CVPR), 2011 IEEE Conference on (pp. 2377-2384). IEEE.
Felzenszwalb, P. F., Girshick, R. B., McAllester, D., & Ramanan, D. (2010). Object detection with discriminatively trained part-based models. IEEE transactions on pattern analysis and machine intelligence, 32(9), 1627-1645.
Förstner, W., Dickscheid, T., Schindler, F.: Detecting Interpretable and Accurate Scale-Invariant Keypoints. In: ICCV. (Sep. 2009).
Han, X., Leung, T., Jia, Y., Sukthankar, R., & Berg, A. C. (2015). Matchnet: Unifying feature and metric learning for patch-based matching. In Proceedings of the IEEE Conference on Computer Vision and Pattern Recognition (pp. 3279-3286).
Harris, C., Stephens, M.: A Combined Corner and Edge Detector. In: Fourth Alvey Vision Conference. (1988)
Jaderberg, M., Simonyan, K., & Zisserman, A. (2015). Spatial transformer networks. In Advances in Neural Information Processing Systems (pp. 2017-2025).
Leutenegger, S., Chli, M., & Siegwart, R. Y. (Nov. 2011). BRISK: Binary robust invariant scalable keypoints. In Computer Vision (ICCV), 2011 IEEE International Conference on (pp. 2548-2555). IEEE.
Lowe, D. G. (2004). Distinctive image features from scale-invariant keypoints. International journal of computer vision, 60(2), 91-110.
Mainali, P., Lafruit, G., Tack, K., Van Gool, L., & Lauwereins, R. (2014). Derivative-based scale invariant image feature detector with error resilience. IEEE Transactions on Image Processing, 23(5), 2380-2391.
Mainali, P., Lafruit, G., Yang, Q., Geelen, B., Van Gool, L., & Lauwereins, R. (2013). SIFER: scale-invariant feature detector with error resilience. International journal of computer vision, 104(2), 172-197.
Matas, J., Chum, O., Urban, M., & Pajdla, T. (2004). Robust wide-baseline stereo from maximally stable extremal regions. Image and vision computing, 22(10), 761-767.
Mikolajczyk, K., & Schmid, C. (2002). An affine invariant interest point detector. Computer Vision—ECCV 2002, 128-142.
Mikolajczyk, K., & Schmid, C. (2004). Scale & affine invariant interest point detectors. International journal of computer vision, 60(1), 63-86.
Mikolajczyk, K., & Schmid, C. (2005). A performance evaluation of local descriptors. IEEE transactions on pattern analysis and machine intelligence, 27(10), 1615-1630.
Moo Yi, K., Verdie, Y., Fua, P., & Lepetit, V. (2016). Learning to assign orientations to feature points. In Proceedings of the IEEE Conference on Computer Vision and Pattern Recognition (pp. 107-116).
Moravec, H.: Obstacle Avoidance and Navigation in the Real World by a Seeing Robot Rover. In: tech report CMU-RI-TR-80-03, Robotics Institute, Carnegie Mellon University, Stanford University. (Sep. 1980)
Paulin, M., Douze, M., Harchaoui, Z., Mairal, J., Perronin, F., & Schmid, C. (2015). Local convolutional features with unsupervised training for image retrieval. In Proceedings of the IEEE International Conference on Computer Vision (pp. 91-99).

(56) References Cited

OTHER PUBLICATIONS

Perez, C. B., & Olague, G. (2013). Genetic programming as strategy for learning image descriptor operators. Intelligent Data Analysis, 17(4), 561-583.
Rosten, E., & Drummond, T. (2006). Machine learning for high-speed corner detection. Computer vision—ECCV 2006, 430-443.
Rublee, E., Rabaud, V., Konolige, K., & Bradski, G. (Nov. 2011). ORB: An efficient alternative to SIFT or SURF. In Computer Vision (ICCV), 2011 IEEE International Conference on (pp. 2564-2571). IEEE.
Sermanet, P., Chintala, S., & LeCun, Y. (Nov. 2012). Convolutional neural networks applied to house numbers digit classification. In Pattern Recognition (ICPR), 2012 21st International Conference on (pp. 3288-3291). IEEE.
Simonyan, K., Vedaldi, A., Zisserman, A.: Learning Local Feature Descriptors Using Convex Optimisation. PAMI (2014)
Simo-Serra, E., Trulls, E., Ferraz, L., Kokkinos, I., Fua, P., & Moreno-Noguer, F. (2015). Discriminative learning of deep convolutional feature point descriptors. In Proceedings of the IEEE International Conference on Computer Vision (pp. 118-126).
Sochman, J., & Matas, J. (2007). Learning a fast emulator of a binary decision process.
Strecha, C., Bronstein, A., Bronstein, M., Fua, P.: LDAHash: Improved Matching with Smaller Descriptors. PAMI 34(1) (Jan. 2012)
Strecha, C., Von Hansen, W., Van Gool, L., Fua, P., & Thoennessen, U. (Jun. 2008). On benchmarking camera calibration and multi-view stereo for high resolution imagery. In Computer Vision and Pattern Recognition, 2008. CVPR 2008. IEEE Conference on (pp. 1-8). Ieee.
Tola, E., Lepetit, V., & Fua, P. (Jun. 2008). A fast local descriptor for dense matching. In Computer Vision and Pattern Recognition, 2008. CVPR 2008. IEEE Conference on (pp. 1-8). IEEE.
Tola, E., Lepetit, V., & Fua, P. (2010). Daisy: An efficient dense descriptor applied to wide-baseline stereo. IEEE transactions on pattern analysis and machine intelligence, 32(5), 815-830.
Trujillo, L., & Olague, G. (Aug. 2006). Using evolution to learn how to perform interest point detection. In Pattern Recognition, 2006. ICPR 2006. 18th International Conference on (vol. 1, pp. 211-214). IEEE.
Verdie, Y., Yi, K.M., Fua, P., Lepetit, V.: TILDE: A Temporally Invariant Learned DEtector. In: CVPR. (2015)
Wang, Z., Fan, B., & Wu, F. (Nov. 2011). Local intensity order pattern for feature description. In Computer Vision (ICCV), 2011 IEEE International Conference on (pp. 603-610). IEEE.
Wilson, K., & Snavely, N. (Sep. 2014). Robust global translations with 1dsfm. In European Conference on Computer Vision (pp. 61-75). Springer International Publishing.
Winder, S. A., & Brown, M. (Jun. 2007). Learning local image descriptors. In Computer Vision and Pattern Recognition, 2007. CVPR'07. IEEE Conference on (pp. 1-8). IEEE.
Wu, C. (Jun. 2013). Towards linear-time incremental structure from motion. In 3DTV-Conference, 2013 International Conference on (pp. 127-134). IEEE.
Zagoruyko, S., & Komodakis, N. (2015). Learning to compare image patches via convolutional neural networks. In Proceedings of the IEEE Conference on Computer Vision and Pattern Recognition (pp. 4353-4361).
Zbontar, J., LeCun, Y.: Computing the Stereo Matching Cost with a Convolutional Neural Network. In: CVPR. (2015)
Zitnick, C. (2010). Binary coherent edge descriptors. Computer Vision—ECCV 2010, 170-182.
Zitnick, C. L., & Ramnath, K. (Nov. 2011). Edge foci interest points. In Computer Vision (ICCV), 2011 IEEE International Conference on (pp. 359-366). IEEE.

\* cited by examiner

|         | SIFT | SIFT-HesAff | SURF | ORB  | Daisy | sGLOH | MROGH | LIOP | BiCE |
|---------|------|-------------|------|------|-------|-------|-------|------|------|
| Strecha | .283 | .314        | .208 | .157 | .272  | .207  | .239  | .211 | .270 |
| DTU     | .272 | .274        | .244 | .127 | .262  | .187  | .223  | .189 | .242 |
| Webcam  | .128 | .164        | .117 | .120 | .120  | .113  | .125  | .086 | .166 |

|         | BRISK | FREAK | VGG  | MatchNet | DeepDesc | PN-Net | KAZE | LIFT-pic | LIFT-rf |
|---------|-------|-------|------|----------|----------|--------|------|----------|---------|
| Strecha | .208  | .183  | .300 | .223     | .298     | .300   | .250 | .374     | .369    |
| DTU     | .193  | .186  | .271 | .198     | .257     | .267   | .213 | .317     | .308    |
| Webcam  | .118  | .116  | .118 | .101     | .116     | .114   | .195 | .196     | .202    |

FIG. 8

|              | Trained on Piccadilly | | Trained on Roman-Forum | |
|--------------|------|---------|------|---------|
|              | Rep. | M.Score | Rep. | M.Score |
| Pre-trained  | .436 | .367    | .447 | .368    |
| Fully-trained| .446 | .374    | .447 | .369    |

FIG. 9

| Det. | Ori. | Desc. | Trained on Piccadilly | | | Trained on Roman-Forum | | |
|------|------|-------|------|--------|---------|------|--------|---------|
|      |      |       | Rep. | NN mAP | M.Score | Rep. | NN mAP | M.Score |
| SIFT | SIFT | SIFT  |      | .517   | .282    |      | .517   | .282    |
| SIFT | Ours | SIFT  | .428 | .671   | .341    | .428 | .662   | .338    |
| SIFT | SIFT | Ours  |      | .568   | .290    |      | .581   | .295    |
| SIFT | Ours | Ours  |      | .685   | .344    |      | .688   | .342    |
| Ours | SIFT | SIFT  |      | .540   | .325    |      | .545   | .319    |
| Ours | Ours | SIFT  | .446 | .644   | .373    | .447 | .630   | .360    |
| Ours | SIFT | Ours  |      | .629   | .339    |      | .644   | .337    |
| Ours | Ours | Ours  | .446 | .686   | .374    | .447 | .683   | .369    |

FIG. 10

METHOD, SYSTEM, AND DEVICE FOR LEARNED INVARIANT FEATURE TRANSFORM FOR COMPUTER IMAGES

CROSS-REFERENCE TO RELATED APPLICATIONS

The present invention claims priority to the U.S. provisional patent application with the Ser. No. 62/404,442 that was filed on Oct. 5, 2016, the entire contents thereof being herewith incorporated by reference.

FIELD OF THE INVENTION

The present invention is directed to the field of image processing and computer vision, more particularly feature detection, feature orientation calculation, and extracting a description for generating a feature vector of an image, for image processing algorithms, machine learning, and pattern recognition.

BACKGROUND

Local features play a key role in many Computer Vision applications. Finding and matching them across images has been the subject of vast amounts of research. Until recently, the best techniques relied on carefully hand-crafted features as shown in references [1-5]. Over the past few years, as in many areas of Computer Vision, methods based in machine learning, and more specifically deep learning, have started to outperform these traditional methods as shown in references [6-10]. These new algorithms, however, address only a single step in the complete processing chain, which includes detecting the features, computing their orientation, and extracting robust representations that allow to match them across images. Therefore, in light of the deficiencies of the background art, novel and integrated solutions are desired for detecting features, computing their orientation, and extracting description of these features, in the field of image processing.

SUMMARY

According to one aspect of the present invention, a method for training a feature detector of an image processor is provided. Preferably, the method includes the steps of detecting features in the image to generate a score map, computing a center of mass on the score map to generate a location, extracting a patch from the image at the location by a first spatial transformer, and estimating an orientation of the patch. Moreover, the method preferably further includes the steps of rotating the patch in accordance with the patch orientation with a second spatial transformer, and describing the rotated patch to create a description vector.

According to another aspect of the present invention, a device including a processor and data storage is provided, the image processing device adapted for detecting features in an image. Preferably, the processor is configured to detect features in the image to generate a score map, compute a center of mass on the score map to generate a location, extract a patch from the image at the location by a first spatial transformer, and estimate an orientation of the patch. Moreover, preferably the processor is further configured to rotate the patch in accordance with the patch orientation with a second spatial transformer, and describe the rotated patch to create a description vector.

According to still another aspect of the present invention, a non-transitory computer readable medium having computer instructions recorded thereon is provided. The computer instructions are configured to perform a method for training a feature detector when executed on a computer. Preferably, the method includes the steps of detecting features in the image to generate a score map, computing a center of mass on the score map to generate a location, extracting a patch from the image at the location by a first spatial transformer, and estimating an orientation of the patch. Moreover, the method preferably further includes the steps of rotating the patch in accordance with the patch orientation with a second spatial transformer, and describing the rotated patch to create a description vector.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS AND TABLES

The accompanying drawings, which are incorporated herein and constitute part of this specification, illustrate the presently preferred embodiments of the invention, and together with the general description and the tables given above and the detailed description given below, serve to explain features of the invention.

FIG. 1 shows a schematic representation of the training architecture for the integrated feature extraction pipeline, according to one aspect of the present invention. The pipeline includes three major components: the detector DET, the orientation estimator ORI, and the descriptor DESC, and these elements are tied together with differentiable operations to preserve end-to-end differentiability;

FIG. 2 schematically depicts the Siamese training architecture with four branches, which takes as input a quadruplet of patches;

FIGS. 3A, 3B, 3C, and 3D show sample images and patches from Piccadilly (see FIG. 3A and details in FIG. 3B) and Roman-Forum (see FIG. 3C and details in FIG. 3D). Keypoints that survive the SfM pipeline are drawn in white, and the rest in black;

FIG. 4 shows a schematic overview of the runtime architecture according to one aspect of the present invention. As the orientation estimator ORI and the descriptor DESC only require evaluation at local maxima, the trained detector DET is decoupled and run it in scale space using a full image with traditional NMS to obtain proposals for the two other components ORI and DESC;

FIGS. 5A and 5B show images with qualitative local feature matching examples, with FIG. 5A the SIFT method and with FIG. 5B the matching with the present LIFT method. Correct matches recovered by each method are shown with connecting lines, and the descriptor support regions with circles. For both FIGS. 5A and 5B, the top row shows Herz-Jesu-P8 of Strecha, second row shows Frankfurt of Webcam, third row shows Scene 7 of DTU and bottom row shows Scene 19 of DTU. It can be appreciated that the images are very different from one another;

FIGS. 6A, 6B, and 6C show tables with the average matching score for all baselines;

FIG. 8 shows a table to represent the average matching score for all baselines;

FIG. 9 shows a table to represent the results on Strecha for both LIFT models trained on Piccadilly and Roman-Forum, with the pre-trained and fully-trained Detector; and FIG. 10 shows a table to represent the results on Strecha for both LIFT models trained on Piccadilly and Roman-Forum, interchanging the present components with their SIFT counterparts.

Herein, identical reference numerals are used, where possible, to designate identical elements that are common to the figures. Also, the images are simplified for illustration purposes and may not be depicted to scale.

BRIEF DESCRIPTION OF THE SEVERAL EMBODIMENTS

Figure 1:
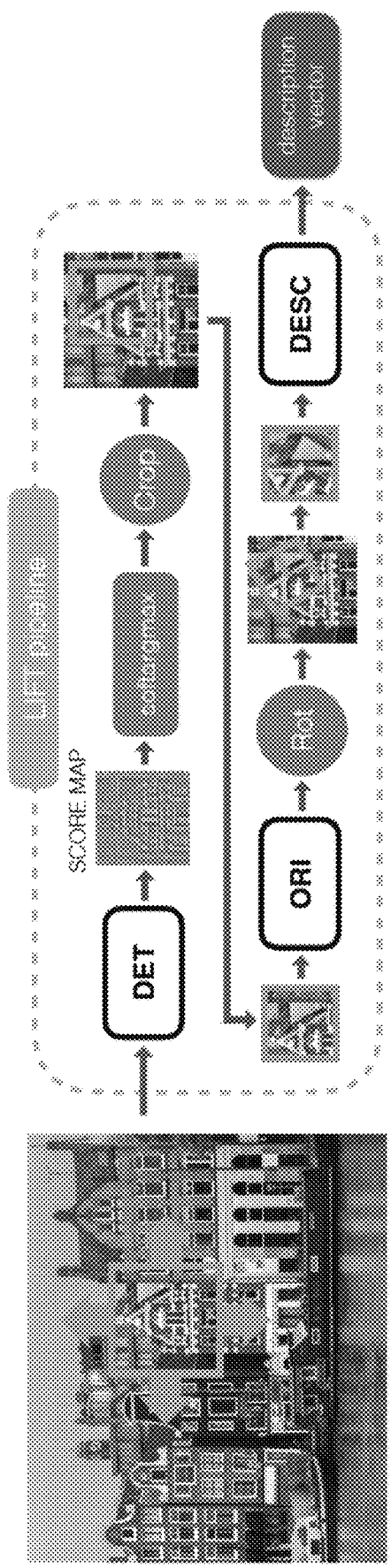

With the present method, device, and system, according to an aspect, a novel deep architecture is proposed that performs all three steps together. It is shown that it achieves better overall performance than the background methods, in large part because it allows these individual steps to be optimized to perform well in conjunction with each other. With the architecture or pipeline that is used with the present method for learning purposes, which is referred to as Learned Invariant Feature Transform ("LIFT"), is depicted schematically by FIG. 1. FIG. 1 shows a schematic representation of LIFT method and architecture, including three major components, the detector DET, the orientation estimator ORI, and the descriptor DESC. They are tied together with differentiable operations to preserve end-to-end differentiability. An image or a part of an image can be input to the detector DET, and the descriptor DESC outputs a description vector or feature vector for the inputted image. Given an input image, the detector DET provides a score map, next a softargmax is performed on the score map to generate the location of a single potential feature point, and with a spatial transformer layer Crop, a smaller patch p is extracted and centered on the location. Next, the smaller patch p enters orientation estimator ORI and predicts a patch orientation $\theta$. Thereafter, the smaller patch p is rotated according to the orientation $\theta$ using a second spatial transformer layer Rot, to produce smaller rotated patch $p_\theta$, and $p_\theta$ is then fed to a network of descriptors DESC, which computes a feature vector.

As explained above, the method is performed based on an architecture that includes three components that feed into each other: the detector DET, the orientation estimator ORI, and the descriptor DESC. Each one is based on Convolutional Neural Networks (CNNs), and patterned after recent ones that have been shown to perform these individual functions well. To mesh them together, spatial transformers as discussed in reference [11] are used to rectify the image patches given the output of the detector and the orientation estimator. The traditional approaches to non-local maximum suppression (NMS) are replaced by the softargmax function as shown in reference [12], this reference being herewith incorporated by reference in its entirety. This allows to preserve end-to-end differentiability, and results in a full network that can still be trained with backpropagation, which is not the case of any other architecture of the background art.

Also, it is shown how to learn such a pipeline in an effective manner. To this end, a Siamese network has been built and it was trained using the feature points produced by a Structure-from-Motion (SfM) algorithm was performed on images of a scene captured under different viewpoints and lighting conditions, to learn its weights. This training problem is formulated on image patches extracted at different scales to make the optimization tractable. In practice, it was found to be impossible to train the full architecture from scratch, because the individual components try to optimize for different objectives. Instead, a problem-specific learning approach is introduced to overcome this problem. It involves training the descriptor first, which is then used to train the orientation estimator, and finally the detector, based on the already learned descriptor and orientation estimator, differentiating through the entire network. At test time, the detector DET was decoupled, which runs over the whole image in scale space, from the orientation estimator ORI and descriptor DESC, which process only the keypoints.

Next, the background approaches are briefly discussed, and then the present approach is discussed in detail and show that it outperforms many of the background methods. As mentioned above, in the background art, the publications always revolve about separate tasks of finding feature points, computing their orientation, and matching the feature points. Therefore, for clarity purposes, these three elements are discussed separately herein.

With respect to the feature point detectors, research on feature point detection has focused mostly on finding distinctive locations whose scale and rotation can be reliably estimated. Early works, as discussed in references [13, 14] used first-order approximations of the image signal to find corner points in images. FAST from reference [15] used Machine Learning techniques but only to speed up the process of finding corners. Other than corner points, SIFT from reference [1] detect blobs in scale-space; SURF from reference [2] use Haar filters to speed up the process; Maximally Stable Extremal Regions (MSER) from reference [16] detect regions; reference [17] detect affine regions. SFOP from reference [18] use junctions and blobs, and Edge Foci from reference [19] use edges for robustness to illumination changes. More recently, feature points based on more sophisticated and carefully designed filter responses as shown in references [5, 20] have also been proposed to further enhance the performance of feature point detectors. In contrast to these approaches that focus on better engineering, and following the early attempts in learning detectors from references [21, 22], [6] showed that a detector could be learned to deliver significantly better performance than the state-of-the-art. In this work, piecewise-linear convolutional filters are learned to robustly detect feature points despite of lighting and seasonal changes. Unfortunately, this was done only for a single scale and from a dataset without viewpoint changes. This concept was used and substantially extended it substantially to incorporate it into the pipeline of the present method, device, and system.

Regarding the orientation estimation, despite the fact that orientation estimation plays a critical role in matching feature points, the problem of estimating a discriminative orientation has received noticeably less attention than detection or feature description. As a result, the method introduced by SIFT of reference [1] remains the de facto standard up to small improvements, such as the fact that it can be sped-up by using the intensity centroid, as in ORB of reference [4]. A departure from this can be found in reference [9] that introduced a deep learning-based approach to predicting stable orientations. This resulted in significant gains over the background art. This architecture was incorporated into the pipeline of the present method and show how to train it using the problem-specific training strategy, given the learned descriptors DESC.

With respect to the feature descriptors DESC, feature descriptors are designed to provide discriminative representations of salient image patches, while being robust to transformations such as viewpoint or illumination changes. The field reached maturity with the introduction of SIFT of reference [1], which is computed from local histograms of gradient orientations, and SURF of reference [2], which uses integral image representations to speed up the computation. Along similar lines, DAISY of reference [3] relies on convolved maps of oriented gradients to approximate the histograms, which yields large computational gains when extracting dense descriptors. Even though they have been extremely successful, these hand-crafted descriptors can now be outperformed by newer ones that have been learned. These range from unsupervised hashing to supervised learning techniques based on linear discriminant analysis as shown in references [23, 24], genetic algorithm of reference [25], and convex optimization of reference [26]. An even more recent trend is to extract features directly from raw image patches with CNNs trained on large volumes of data. For example, MatchNet of reference [7] trained a Siamese CNN for feature representation, followed by a fully-connected network to learn the comparison metric. DeepCompare of reference [8] showed that a network that focuses on the center of the image can increase performance. The approach of reference [27] relied on a similar architecture to obtain state-of-the-art results for narrow-baseline stereo. In reference [10], hard negative mining was used to learn compact descriptors that use on the Euclidean distance to measure similarity. The algorithm of reference [28] relied on sample triplets to mine hard negatives. According to one aspect, the architecture of reference [10] is relied upon because the corresponding descriptors are trained and compared with the Euclidean distance, which has a wider range of applicability than descriptors that require a learned metric.

Figure 2:
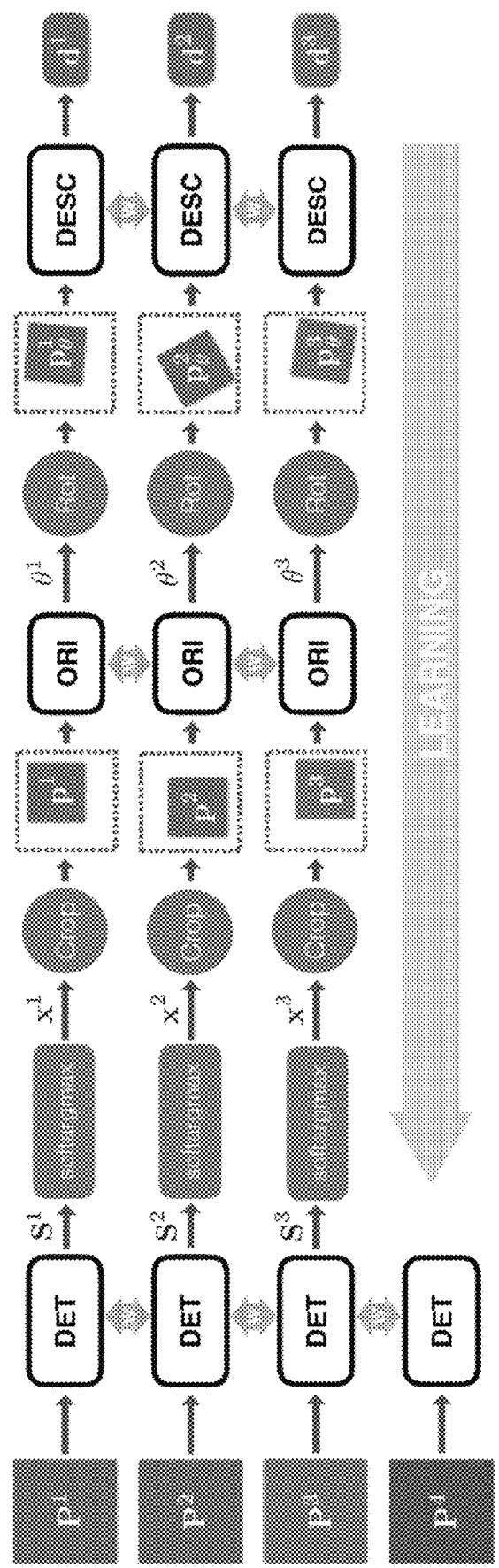
Figure 3A:
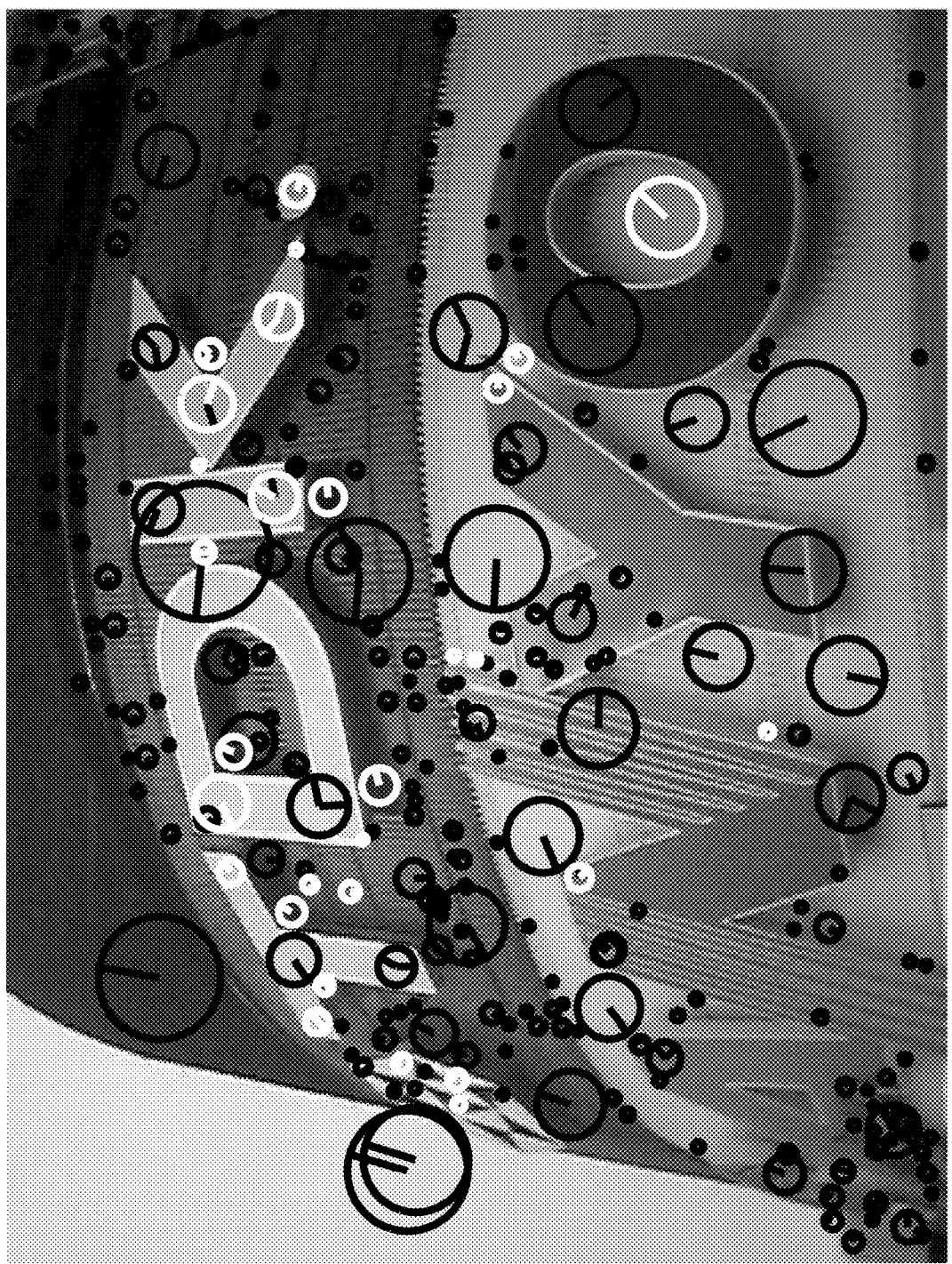
Figure 3B:
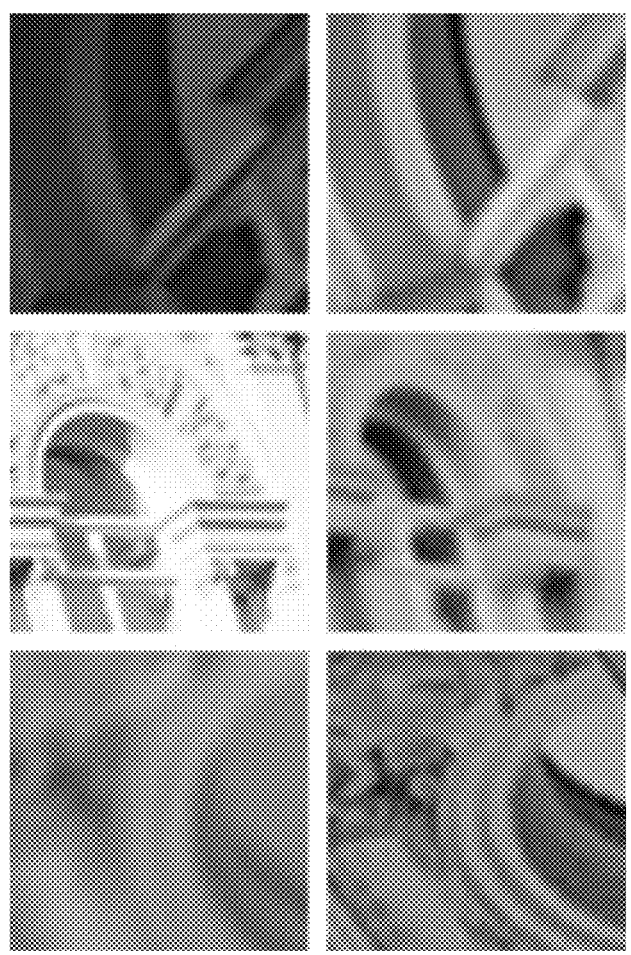
Figure 3C:
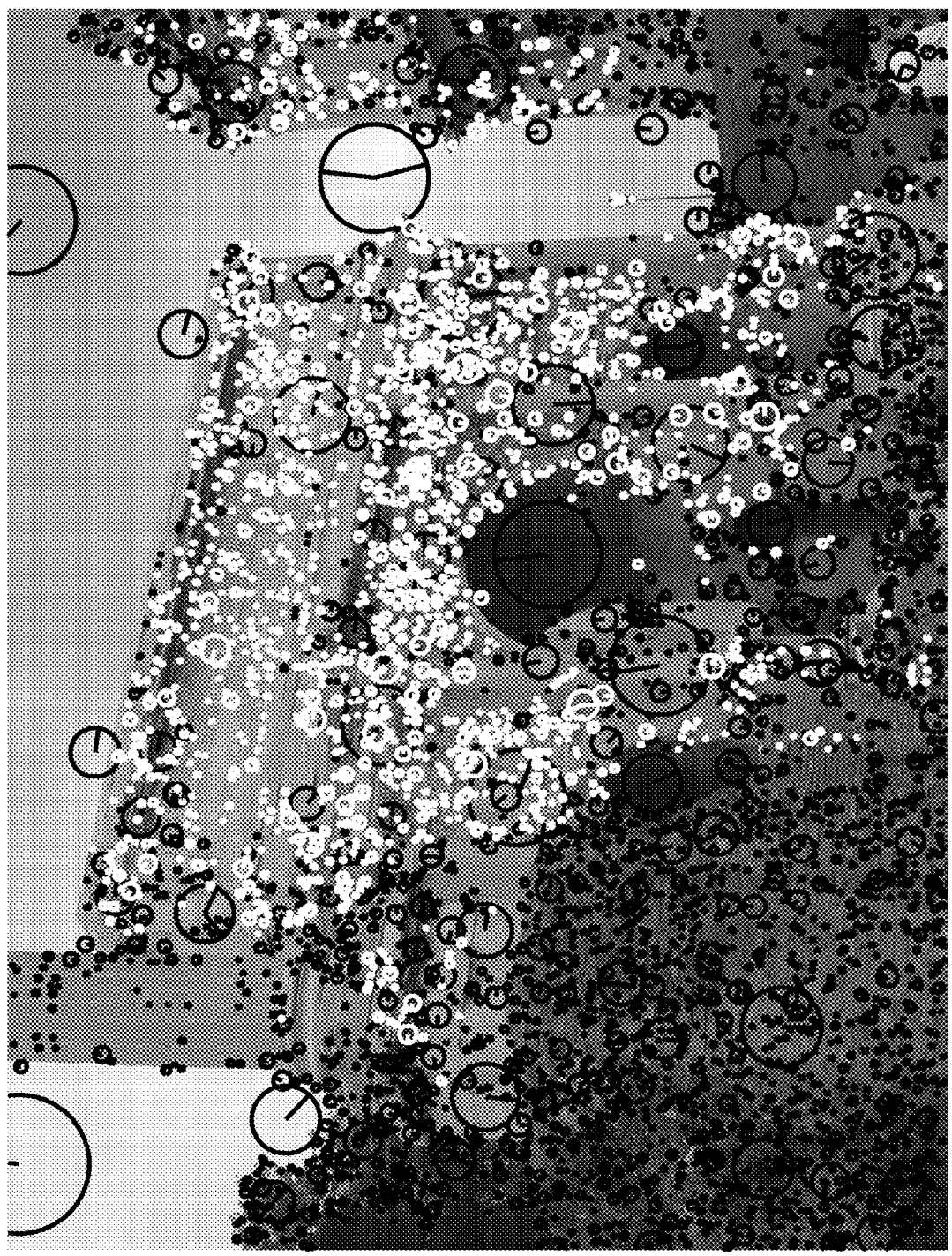
Figure 3D:
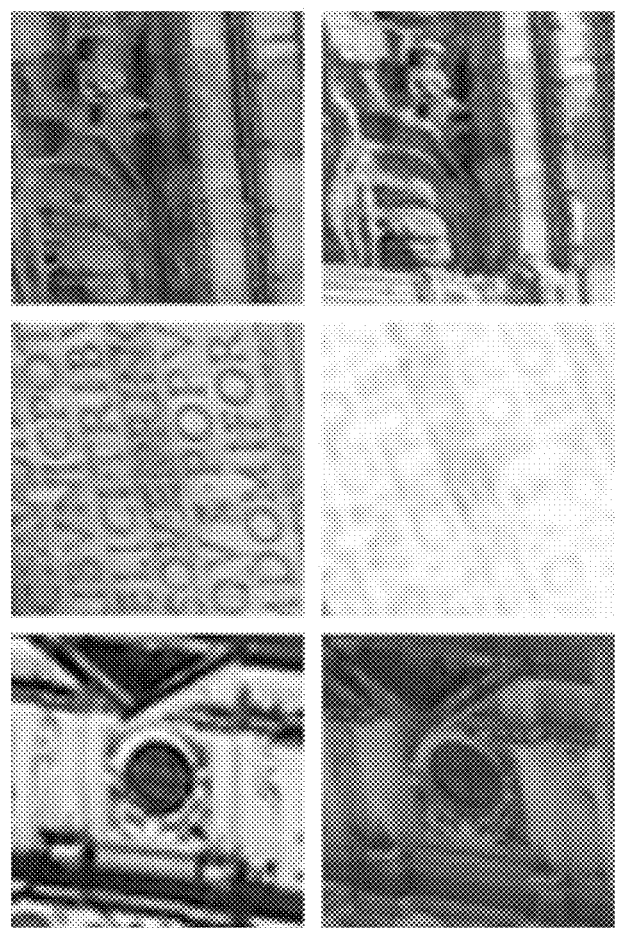

Regarding the present LIFT method, and a corresponding device and system, first the entire feature detection and description pipeline is formulated in terms of the Siamese architecture depicted by FIG. 2. Next, the type of data is discussed that is preferably needed to train the networks of the DET, ORI, and DESC, and how to collect the training data. Thereafter, the training procedure is described in detail.

For training purposes and to show the performance, image patches are used as input, rather than full images. This makes the learning scalable without loss of information, as most image regions do not contain keypoints. However, for a full implementation of the LIFT method, full images can be used.

The patches are extracted from the keypoints used by a SfM pipeline, as will be discussed in below with respect to the creation of the training dataset. The patches are chosen to be small enough that it can be assumed they contain only one dominant local feature at the given scale, which reduces the learning process to finding the most distinctive point in the patch. To train the network, the four-branch Siamese architecture is created pictured in FIG. 2. Each branch contains three distinct CNNs, a detector DET, an orientation estimator ORI, and a descriptor DESC. For training purposes, quadruplets of image patches are used. Each one includes two image patches $P^1$ and $P^2$, that correspond to different views of the same three-dimensional (3D) point, one image patch $P^3$, that contains the projection of a different 3D point, and one image patch $P^4$ that does not contain any distinctive feature point. During training, the i-th patch $P^i$ of each quadruplet will go through the i-th branch.

To achieve end-to-end differentiability, the components of each branch are connected as follows, as exemplarily shown in FIGS. 1 and 2. (1) Given an input image patch P, the detector DET provides a score map S. (2) A softargmax is performed on the score map S and return the location x of a single potential feature point. (3) A smaller patch p is extracted and centered on x with the spatial transformer layer Crop. This serves as the input to the orientation estimator ORI. (4) The orientation estimator ORI predicts a patch orientation θ. (5) The smaller patches p are rotated according to this orientation using a second spatial transformer layer Rot, to produce smaller rotated patch $p_\theta$. (6) $p_\theta$ is fed to a network of descriptors DESC, which computes a feature vector d.

Patches $P^1$ and $P^2$ shown as the upper two patches entering the detector DET, correspond to different views of the same physical point, and are used as positive examples to train the descriptor DET, $P^3$, on FIG. 2 depicted as the second lowest patch shows a different three-dimensional (3D) point, which serves as a negative example for the descriptor; and $P^4$, on FIG. 2 shown as the lowest patch contains no distinctive feature points and is only used as a negative example to train the detector. Given a patch P, the detector DET, the softargmax, and the spatial transformer layer Crop provide all together a smaller patch p inside P. The small patch p is then fed to the orientation estimator ORI, which along with the spatial transformer layer Rot, provides the rotated patch $p_\theta$ that is then entered and processed by the descriptor DESC to obtain the final description vector d.

The final description vector d is a local abstraction of the imagery data, and could be used for any application that requires such abstraction. This includes but is not limited to applications such as visual tracking, motion detection, MPEG encoding, feature-based object recognition, image search. As a non-limiting example, U.S. Pat. No. 9,418,320 shows how a description vector can be used, describing local features as feature points, for the purpose of performing motion detection, with a pan-tilt-zoom (PTZ) camera.

The spatial transformer layers Crop are used only to manipulate the image patches while preserving differentiability, and unlike DET, ORI, and DESC, they are not learned modules. Also, both the location x proposed by the detector DET and the orientation θ for the patch proposal are treated implicitly, meaning that the entire network discovers distinctive locations and stable orientations while learning.

Since the network of the present method, device, and system includes components with different purposes, learning the weights is non-trivial aspect. The early attempts at training the network as a whole from scratch were unsuccessful. Therefore, a problem-specific learning approach was designed that involves learning first the descriptor DET, then the orientation estimator ORI given the learned descriptor, and finally the detector DESC, conditioned on the other two. This allows to tune the orientation estimator ORI for the descriptor DESC, and the detector DET for the other two components. This learning strategy is further elaborated further below, with the detailed description of the descriptor DESC, of the orientation estimator ORI, and the detector DET, that is, in the order they are learned.

Regarding the creation of the training dataset, there are datasets that can be used to train feature descriptors as shown in reference [24] and orientation estimators as shown in reference [9]. However it is not so clear how to train a keypoint detector, and the vast majority of techniques still rely on hand-crafted features. The TILDE detector of reference [6] is an exception, but the training dataset does not exhibit any viewpoint changes.

To achieve invariance, images that capture views of the same scene under different illumination conditions and seen from different perspectives are required. Accordingly, photo-tourism image sets were used. The collections from Piccadilly Circus in London and the Roman Forum in Rome from reference [29] to reconstruct the 3D using VisualSFM as discussed in reference [30] were used, which relies of SIFT features. Piccadilly contains 3384 images, and the reconstruction has 59 k unique points with an average of 6.5 observations for each. Roman-Forum includes 1658 images and 51 k unique points, ith an average of 5.2 observations for each. FIGS. 3A, 3B, 3C, and 3D show some examples. The data was split into training and validation sets, discarding views of training points on the validation set and vice-versa. To build the positive training samples, only the feature points that survive the SfM reconstruction process were considered. To extract patches that do not contain any distinctive feature point, as required by the present training method, image regions that contain no SIFT features were randomly sampled, including those that were not used by SfM.

Grayscale training patches were extracted according to the scale $\sigma$ of the point, for both feature and non-feature point image regions. Patches P are extracted from a $24\sigma \times 24\sigma$ support region at these locations, and standardized into $S \times S$ pixels where $S=128$. The smaller patches p and smaller rotated patches $p_\theta$ that serve as input to the orientation estimator and the descriptor, are cropped and rotated versions of these patches, each having size $s \times s$, where $s=64$. The smaller patches selectively correspond to the SIFT descriptor support region size of $12\sigma$. To avoid biasing the data, uniform random perturbations are applied to the patch location with a range of 20% ($4.8\sigma$). Finally, the patches are normalized with the grayscale mean and standard deviation of the entire training set.

With respect to the descriptor DESC, learning feature descriptors from raw image patches has been extensively researched during the past year, as shown in references [7, 8, 10, 27, 28, 31], with multiple works reporting different results on patch retrieval, narrow baseline stereo, and matching non-rigid deformations. According to one aspect of the present invention, relatively simple networks are used, as explained in reference [10], with three convolutional layers followed by hyperbolic tangent units, $l_2$ pooling as shown in reference [32] and local subtractive normalization, as they do not require learning a metric. In other words, the descriptor DESC is performing the these operations consecutively, to form a robust representation of the region of interest (ROI). This way of implementing the descriptor DESC has shown to provide for the best results over the background art. In theory, other methods permitting differentiable aggregation of local information should suffice. The descriptor can be formalized simply as shown in the following equation.

$$d = h_\rho(p_\theta), \quad (1)$$

where h(.) denotes the CNN of descriptor DESC, $\rho$ its parameters, and $p_\theta$ is the rotated patch from the orientation estimator. When training the descriptor, the detector and the orientation estimator are not yet trained. Therefore, the image locations and orientations of the feature points that are used by the SfM to generate image patches $p_\theta$.

Next, the descriptor is trained by minimizing the sum of the loss for pairs of corresponding patches $(p_\theta^1, p_\theta^2)$ and the loss for pairs of non-corresponding patches $(p_\theta^1, p_\theta^3)$. The loss for pair $(p_\theta^k, p_\theta^l)$ is defined as the hinge embedding loss of the Euclidean distance between their description vectors. It can be expressed as:

$$\mathcal{L}_{desc}(p_\theta^k, p_\theta^l) = \begin{cases} \|h_\rho(p_\theta^k) - h_\rho(p_\theta^l)\|_2 & \text{for positive pairs, and} \\ \max(0, C - \|h_\rho(p_\theta^k) - h_\rho(p_\theta^l)\|_2) & \text{for negative pairs} \end{cases}, \quad (2)$$

where positive and negative samples are pairs of patches that do or do not correspond to the same physical 3D points, $\|\cdot\|_2$ is the Euclidean distance, and $C=4$ is the margin for embedding.

Hard mining is used during training, which was shown in reference [10] to be critical for descriptor performance, this reference herewith incorporated by reference in its entirety. Following this methodology, $K_f$ sample pairs are forwarded and only the $K_b$ pairs are used with the highest training loss for back-propagation, where $r=K_f/K_b \geq 1$ is the 'mining ratio'. In the reference [10], the network was pre-trained without mining and then fine-tuned with $r=8$. Here, an increasing mining scheme was used starting with $r=1$ and double the mining ratio every 5000 batches. Balanced batches are used with 128 positive pairs and 128 negative pairs, mining each separately.

Regarding the orientation estimator used, the one used and described herein was inspired by that of the one described in reference [9]. However, this specific one requires pre-computations of description vectors for multiple orientations to compute numerically the Jacobian of the method parameters with respect to orientations. This is a specific limitation for the present method because the output of the detector component is treated implicitly throughout the pipeline and it is thus not possible to pre-compute the description vectors.

Therefore, spatial transformers as described in reference [11] were used instead to learn the orientations. Given a patch p from the region proposed by the detector, the orientation estimator predicts an orientation based on the following equation:

$$\theta = g_\phi(p), \quad (3)$$

where g denotes the orientation estimator CNN, and $\phi$ its parameters. Together with the location x from detector DET and the original image patch P, $\theta$ is then used by the second spatial transformer layer Rot(.) to provide a rotated patch $p_\theta = \text{Rot}(P, x, \theta)$ which is the rotated version of patch p.

The orientation estimator ORI has been trained to provide the orientations that minimize the distances between description vectors for different views of the same 3D points. The already trained descriptor DESC is used to compute the description vectors, and as the detector DET is still not trained, the image locations from SfM are used. More formally, the loss for pairs of corresponding patches are minimized, defined as the Euclidean distance between their description vectors $$\mathcal{L}_{orientation}(P^1, x^1, P^2, x^2) = \|h_\rho(G(P^1, x^1)) - h_\rho(G(P^2, x^2))\|_2, \quad (4)$$

where G(P, x) is the patch centered on x after orientation correction: $G(P, x) = \text{Rot}(P, x, g_\phi(\text{Crop}(P, x)))$. In other words, the orientation estimator ORI, in simple terms, is again aggregating local information through CNN to form a two-dimensional expression of the local orientation, similar to the descriptor DESC. The reason the orientation estimator ORI is trained with the loss expressed in Equation (4) is to treat the local orientation expression as something intermediate and let the data teach the orientation estimator ORI what it needs to learn. This complex notation is necessary to properly handle the cropping of the image patches. Recall that pairs ($P^1$, $P^2$) comprise image patches containing the projections of the same 3D point, and locations $x^1$ and $x^2$ denote the reprojections of these 3D points. As in the reference [9], pairs that correspond to different physical points whose orientations are not related are not used.

With respect to the detector, an image patch is taken as input, and a score map is returned or outputted. It is implemented as a convolution layer followed by piecewise linear activation functions, as in TILDE described in the reference [6]. More precisely, the score map S for patch P is computed as:

$$S = f_\mu(P) = \sum_n^N \delta_n \max_m^M (W_{mn} * P + b_{mn}), \quad (5)$$

where $f_\mu(P)$ denotes the detector itself with parameters $\mu$, $\delta n$ is +1 if n is odd and −1 otherwise, $\mu$ is made of the filters $W_{mn}$ and biases $b_{mn}$ of the convolution layer to learn, * denotes the convolution operation, and N and M are hyper-parameters controlling the complexity of the piecewise linear activation function. Instead of aggregating local information, the detector DET attempts to find the most distinctive and robust point in a local region, the local region expressed by patch P. This is expressed by Equation (5), where first a likelihood map is created, the likelihood map expressing how good a location is, and second a place is picked that is believed to be the best location, to create score map S. This location is again driven by the data.

The main difference with TILDE lies in the way this layer is trained. To let S have maxima in places other than a fixed location retrieved by SfM, this location is treated implicitly, as a latent variable. With the present method, device and system, points can potentially be discovered that are more reliable and easier to learn, whereas TILDE cannot. Incidentally, in the experiments performed, it was noticed that it was harmful to force the detector to optimize directly for SfM locations.

From the score map S, the location x is obtained for a feature point as $$x = \text{soft argmax}(S), \quad (6)$$

where soft argmax is a function which computes the center of mass with the weights being the output of a standard softmax function as shown in reference [12]. It can be expressed as $$\text{softargmax}(S) = \frac{\sum_y \exp(\beta S(y|))y}{\sum_y \exp(\beta S(y))}, \quad (7)$$

where y are locations in S, and $\beta=10$ is a hyper-parameter controlling the smoothness of the softargmax. This softargmax function acts as a differentiable version of non-maximum suppression. x is given to the first spatial transformer layer Crop(.) together with the patch P to extract a smaller patch p=Crop (P, x) used as input to orientation estimator ORI.

As the orientation estimator ORI and the descriptor DESC have been learned by this point, the detector DET can be trained given the full pipeline. To optimize over the parameters $\mu$, the distances between description vectors is minimized for the pairs of patches that correspond to the same physical points, while maximizing the classification score for patches not corresponding to the same physical points. More exactly, given training quadruplets ($P^1$, $P^2$, $P^3$, $P^4$) where $P^1$ and $P^2$ correspond to the same physical point, $P_1$ and $P^3$ correspond to different SfM points, and $P^4$ to a non-feature point location, the sum of their loss functions is minimized:

$$\mathcal{L}_{detector}(P^1,P^2,P^3,P^4) = \gamma \, \mathcal{L}_{class}(P^1,P^2,P^3,P^4) + \mathcal{L}_{pair}(P^1,P^2), \quad (8)$$

where $\gamma$ is a hyper-parameter balancing the two terms in this summation $$\mathcal{L}_{class}(P^1, P^2, P^3, P^4) = \sum_{i=1}^4 \alpha_i \max(0, (1 - \text{softmax}(f_\mu(P^i))y_i))^2, \quad (9)$$

with $y_i=-1$ and $\alpha_i=\frac{3}{6}$ if i=4, and $y_i=+1$ and $\alpha_i=\frac{1}{6}$ otherwise to balance the positives and negatives. softmax is the log-mean-exponential softmax function. Expressed in an equation, the following can be found:

$$\mathcal{L}_{pair}(P^1,P^2) = \|h_p(G(P_1,\text{soft argmax}(f_\mu(P^1))) - h_p(G(P^2,\text{soft argmax}(f_\mu(P^2))))\|_2, \quad (10)$$

Note that the locations of the detected feature points x appear only implicitly and are discovered during training. Furthermore, all three components are tied in with the Detector learning. As with the descriptor DESC, a hard mining strategy is used, in this case with a fixed mining ratio of r=4.

In practice, as the descriptor DESC already learns some invariance, it can be hard for the detector DET to find new points to learn implicitly. To let the detector DET start with an idea of the regions it should find, the patch proposals p=Crop(P, softargmax($f_\mu(P)$)) are constrained that correspond to the same physical points to overlap. Thereafter the training the detector without this constraint is continued. Specifically, when pre-training the detector, $\mathcal{L}_{pair}$ is replaced in Equation (8) with $\tilde{\mathcal{L}}_{pair}$, where $\tilde{\mathcal{L}}_{pair}$ is equal to 0 when the patch proposals overlap exactly, and increases with the distance between them otherwise. Therefore, the following equation results:

$$\tilde{\mathcal{L}}_{pair}(P^1, P^2) = 1 - \frac{p^1 \cap p^2}{p^1 \cup p^2} + \frac{\max(0, \|x^1 - x^2\|_1 - 2s)}{\sqrt{p^1 \cup p^2}}, \quad (11)$$

where $x^j=\text{soft argmax}(f_\mu(P_j))$, $p^j=\text{Crop}(P^j, x^j)$, $\|\cdot\|_1$ is the $l_1$ norm. Recall that s=64 pixels is the width and height of the patch proposals in this exemplary embodiment.

Figure 4:
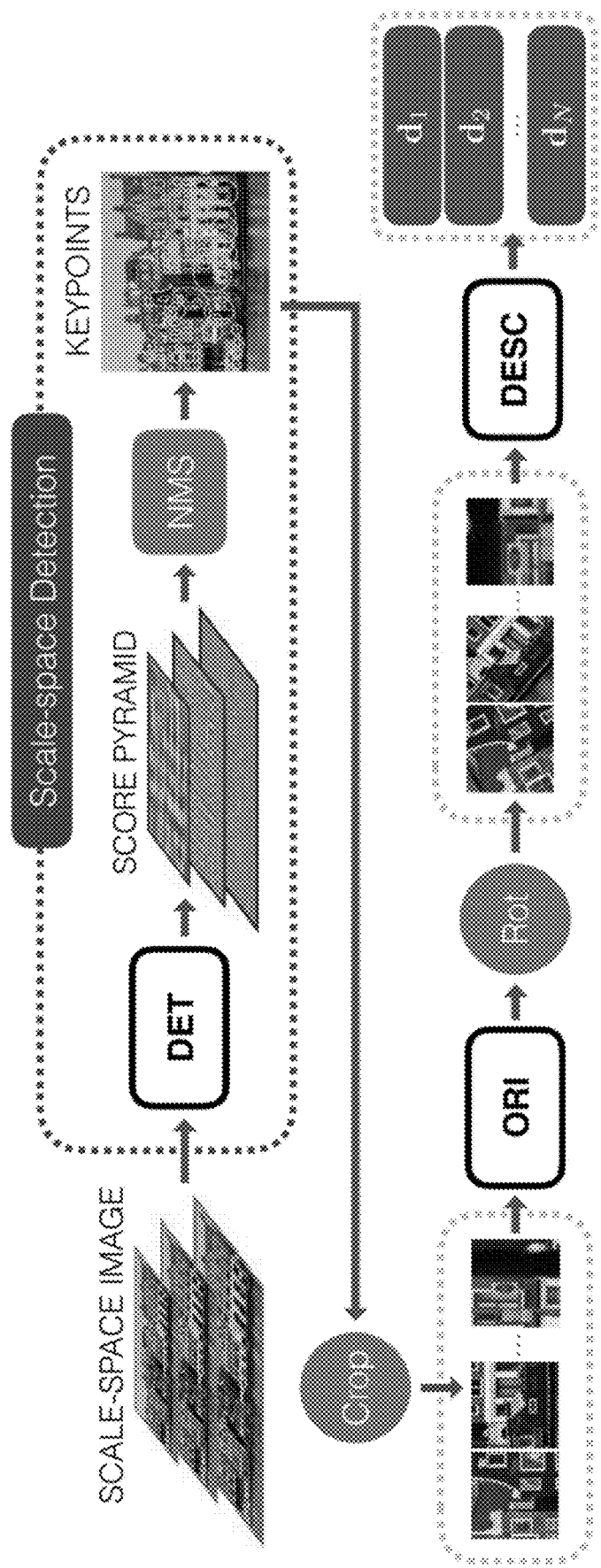

Regarding the runtime pipeline that is used to detect feature vectors from a given scale-space image, the pipeline used is shown in FIG. 4. As the method and device is trained on patches, simply applying it over the entire image would require the network to be tested with a sliding window scheme over the whole image. In practice, this would be too expensive. Fortunately, as the orientation estimator ORI and the descriptor DESC only need to be run at local maxima, the detector DET can be simply decoupled from the rest to apply it to the full image, such that the learned DET is run in scale space, and replace the softargmax function by a scale-space non-local maximum suppression (NMS), as outlined in the upper right dashed box in FIG. 4, to get multiple points as a scale-space score map. Then the orientation estimator ORI and the descriptor DESC are applied only to the patches centered on local maxima. More exactly, the learned detector DET is independently applied to the image at different resolutions to obtain score maps in scale space for the entire image. Then a traditional NMS scheme is applied, similar to that of reference [1] to detect feature point locations. As discussed above, this leads to a more efficient method of detecting feature points in images, and more efficient processor and other type of device for detecting feature points, once the device has been trained by the method as shown in FIG. 1.

Next, the experimental tests and validation is discussed. Hereinafter, first the datasets and metrics that were used are presented. Then qualitative results are presented, followed by a thorough quantitative comparison against a number of background art baselines, which is consistently outperformed in the present method and device. Finally, to better understand what elements of the present method and system approach most contribute to this result, the importance of the pre-training of the detector component are discussed, discussed in above, and analyze the performance gains attributable to each component.

With respect to the dataset and the experimental setup, three different standard datasets are used to evaluate the pipeline of the present method, device, and system. (1) The Strecha dataset of reference [33], which contains 19 images of two scenes seen from increasingly different viewpoints; (2) The DTU dataset of reference [34], which contains sixty (60) sequences of objects with different viewpoints and illumination settings. This dataset is used to evaluate the present method under viewpoint changes; and (3) The Webcam dataset of reference [6], which includes 710 images of six (6) scenes with strong illumination changes but seen from the same viewpoint. This dataset is used to evaluate the present method and device under natural illumination changes.

For Strecha and DTU the provided ground truth is used to establish correspondences across viewpoints. A maximum of 1000 keypoints per image are used, and follow the standard evaluation protocol of reference [35] on the common viewpoint region. This allows to evaluate the following metrics:

(i) Repeatability (Rep.): Repeatability of feature points, expressed as a ratio. This metric captures the performance of the feature point detector by reporting the ratio of keypoints that are found consistently in the shared region.

(ii) Nearest Neighbor mean Average Precision (NN mAP): Area Under Curve (AUC) of the Precision-Recall curve, using the Nearest Neighbor matching strategy. This metric captures how discriminating the descriptor is by evaluating it at multiple descriptor distance thresholds.

(iii) Matching Score (M. Score): The ratio of ground truth correspondences that can be recovered by the whole pipeline over the number of features proposed by the pipeline in the shared viewpoint region. This metric measures the overall performance of the pipeline.

The performance and benchmarks of the present method, device and system can be compared on the three datasets to the following combination of feature point detectors and descriptors, as reported by the authors of the corresponding papers: SIFT [1], SURF [2], KAZE [36], ORB [4], Daisy [37] with SIFT detector, sGLOH [38] with Harris-affine detector [39], MROGH [40] with Harris-affine detector, LIOP [41] with Harris-affine detector, BiCE [42] with Edge Foci detector [19], BRISK [43], FREAK [44] with BRISK detector, VGG [26] with SIFT detector, DeepDesc [10] with SIFT detector, PN-Net [28] with SIFT detector, and MatchNet [7] with SIFT detector. SIFT is also considered with Hessian-Affine keypoints [17]. For the learned descriptors VGG, DeepDesc, PN-Net and MatchNet SIFT keypoints are used because they are trained using a dataset created with Difference-of-Gaussians, which is essentially the same as SIFT. In the case of Daisy, which was not developed for a specific detector, SIFT keypoints are used. To make the results reproducible, additional implementation details are provided for the LIFT method and the baselines in the supplementary material.

Figure 5A:
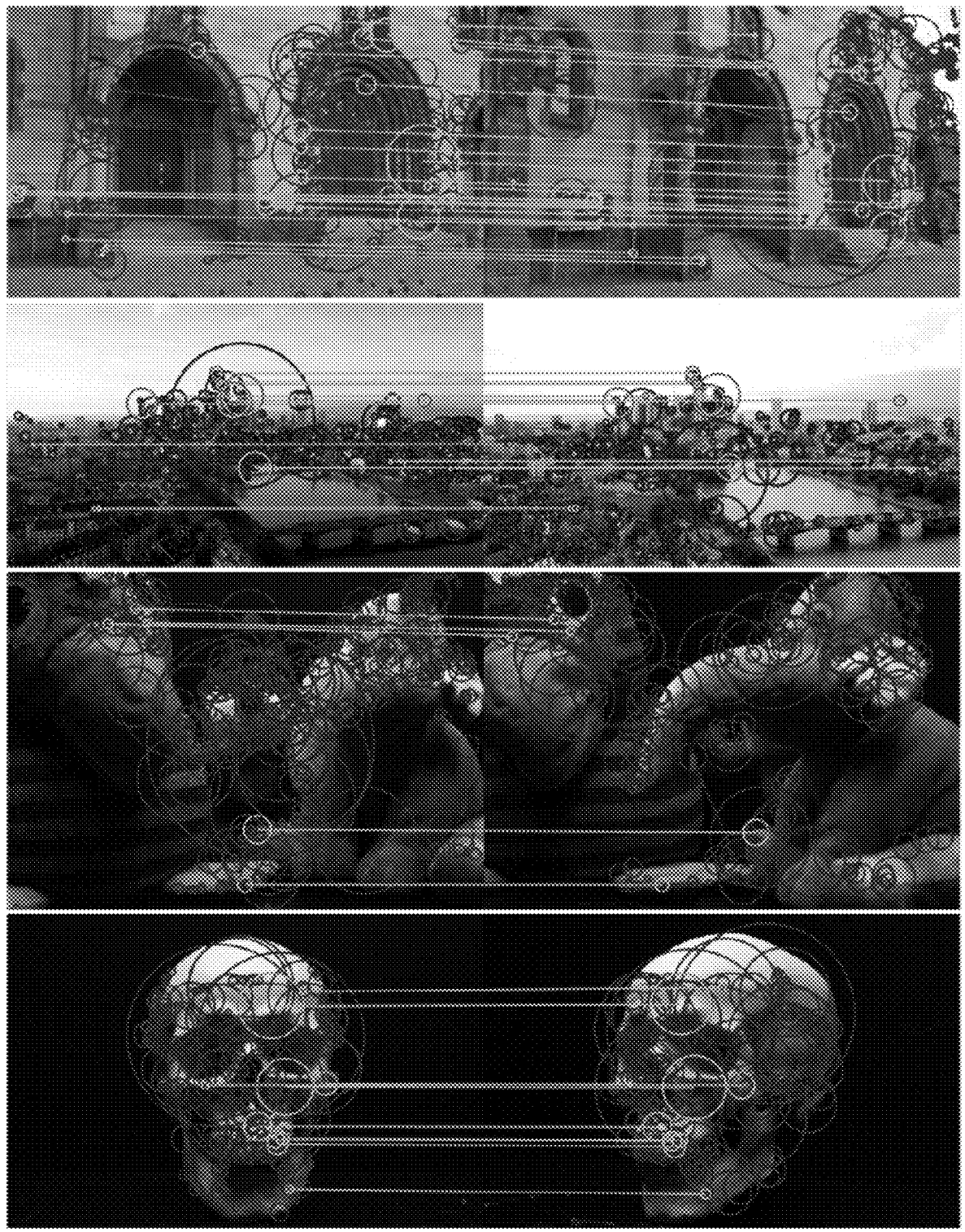
Figure 5B:

Next, qualitative examples are discussed. FIG. 5 shows image matching results with 500 feature points, for both SIFT and the present LIFT pipeline trained with Piccadilly. As expected, LIFT returns more correct correspondences across the two images. One thing to note is that the two DTU scenes in the bottom two rows are completely different from the phototourism datasets that were used for training. Given that the two datasets are very different, this shows good generalization properties.

Figure 6A:
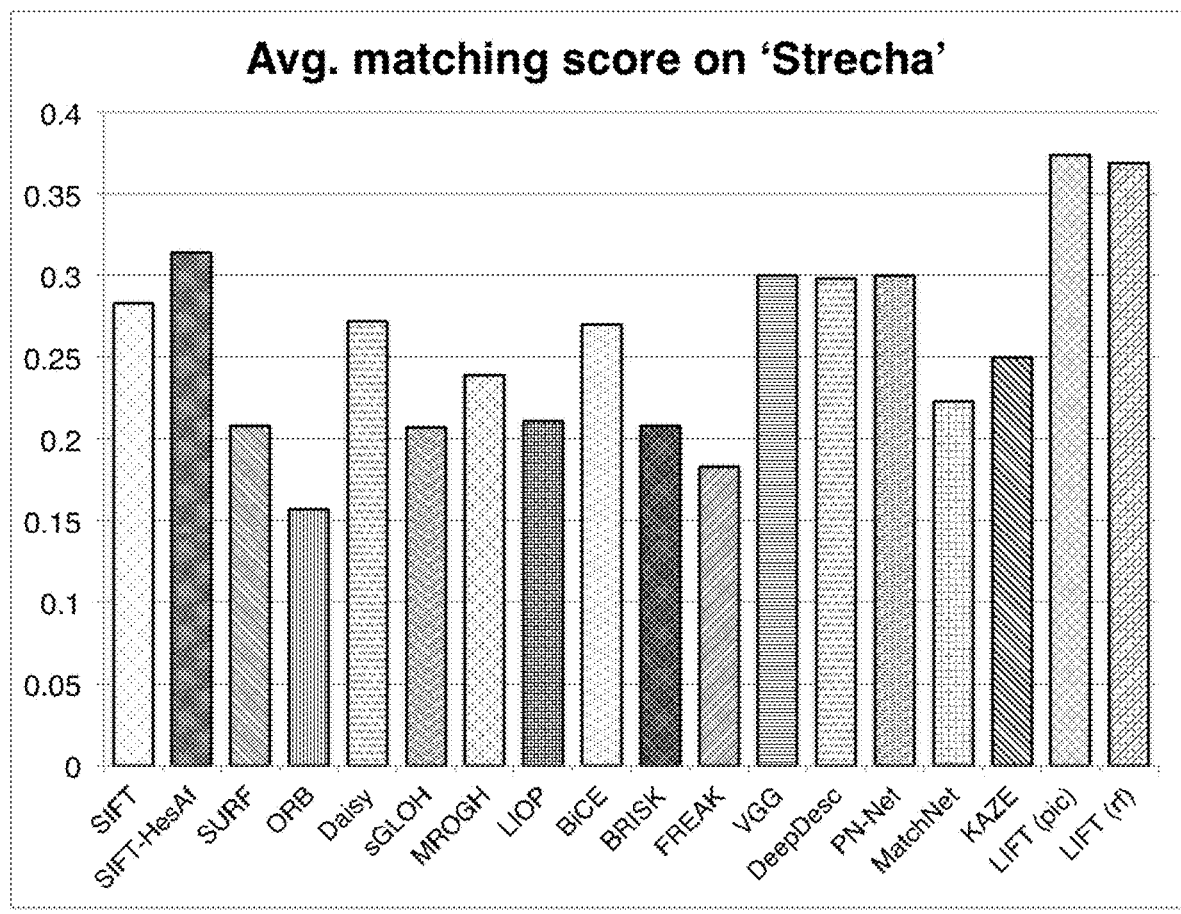
Figure 6B:
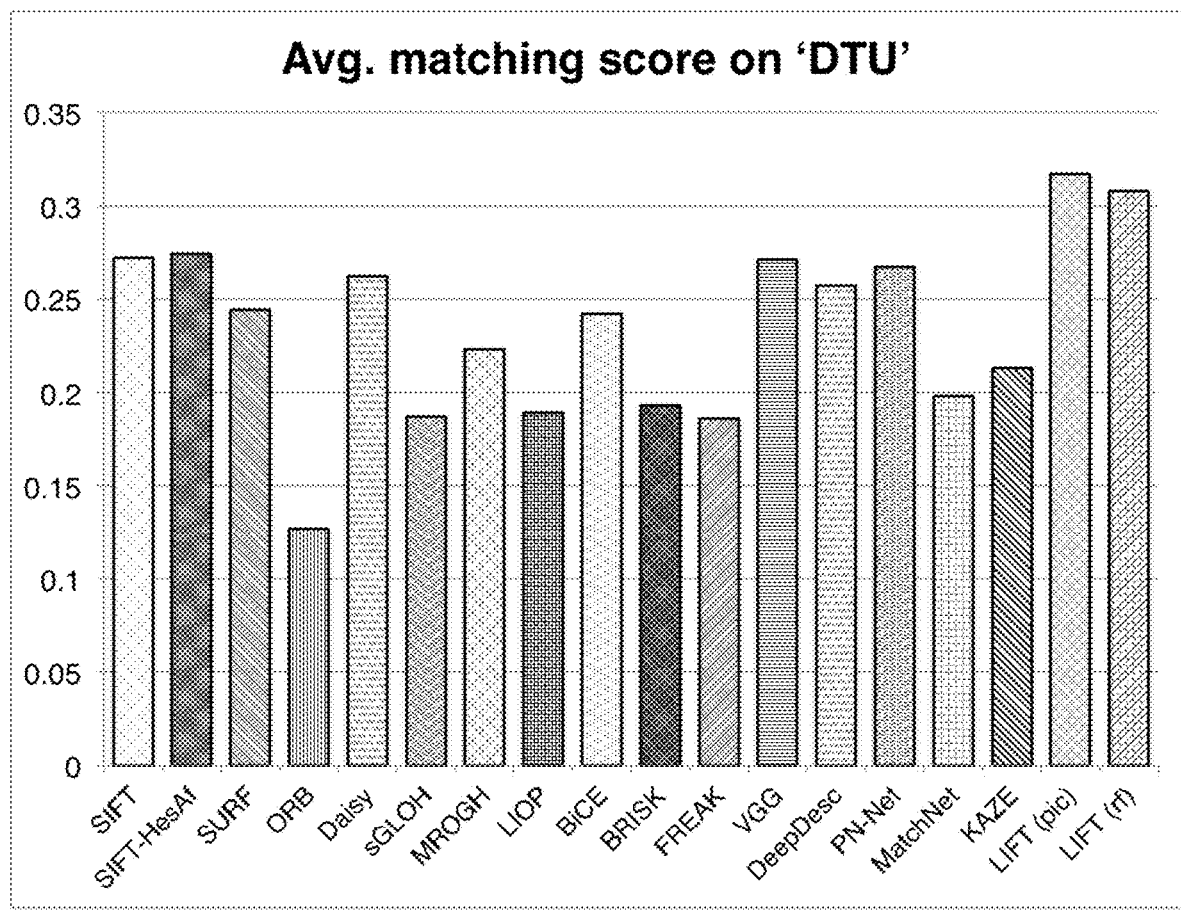
Figure 6C:
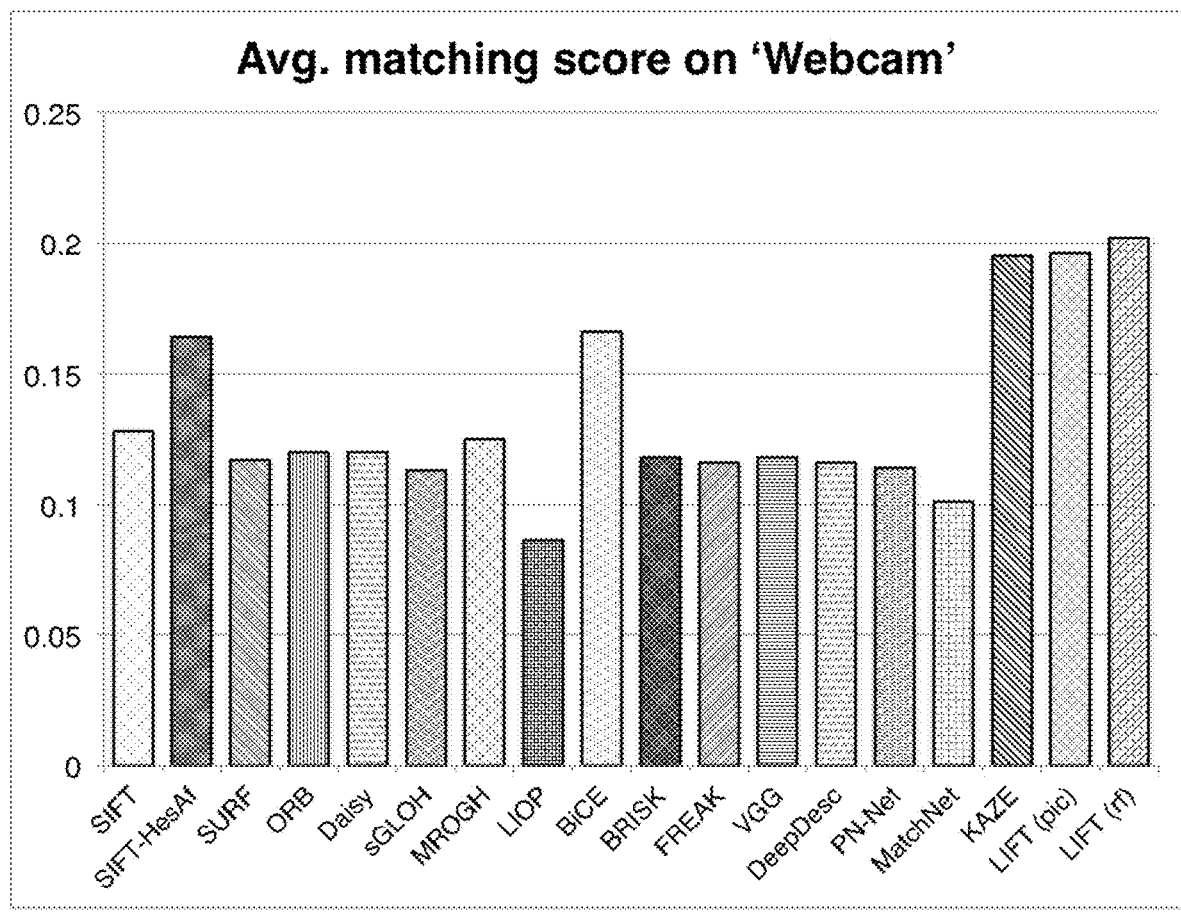

Next, the quantitative evaluation of the full pipeline is discussed. FIG. 6 shows the average matching score for all three datasets, and FIG. 8 shows a table that provides the exact numbers for the two LIFT variants. LIFT (pic) is trained with Piccadilly and LIFT (rf) with Roman-Forum. Both of the present learned models significantly outperform the background art on Strecha and DTU and at least achieve the results of the background art on Webcam. Note that KAZE, which is the best performing competitor on Webcam, performs poorly on the other two datasets. As discussed above, Piccadilly and Roman-Forum are very different from the datasets used for testing. This underlines the strong generalization capability of the present approach, which is not always in evidence with learning-based methods. Interestingly, on DTU, SIFT is still the best performing method among the competitors, even compared to methods that rely on Deep Learning, such as DeepDesc and PN-Net. Also, the gap between SIFT and the learning-based VGG, DeepDesc, and PN-Net is not large for the Strecha dataset. These results show that although a component may outperform another method when evaluated individually, they may fail to deliver their full potential when integrated into the full pipeline, which is what really matters. In other words, it is important to learn the components together, as proposed for the present method and device, and to consider the whole pipeline when evaluating feature point detectors and descriptors.

Next, the performance of individual components are discussed. Regarding the fine-tuning the detector DET. As discussed earlier, the detector is pre-trained and then the training is finalized with the orientation estimator and the descriptor, as discussed above. It is therefore interesting to see the effect of this finalizing stage. In FIG. 9, a table is provided in which the entire pipeline of the method is evaluated with the pre-trained detector and the final detector. As the pair-wise loss term $\mathcal{L}_{pair}$ of Equation (11) is designed to emulate the behavior of an ideal descriptor, the pre-trained Detector already performs well. However, the full training pushes the performance slightly higher. A closer look at FIG. 9 reveals that gains are larger overall for Piccadilly than for Roman-Forum. This is probably due to the fact that Roman-Forum does not have many non-feature point regions. In fact, the network started to over-fit quickly after a few iterations on this dataset. The same happened when it was attempted to fine-tune the full pipeline as a whole, suggesting that the learning strategy presented herein is already providing a superior global solution.

Regarding the performance of individual components, to understand the influence of each component on the overall performance, the components were exchanged with their SIFT counterparts, for both LIFT (pic) and LIFT (rf), on Strecha. The results are shown in the table that is shown in FIG. 10. In short, each time the SIFT components are used, the performance is decreased, thus showing that each element of the pipeline plays and important role. The present detector gives higher repeatability for both models. Having better orientations also helps whichever detector or descriptor is being used, and also the deep descriptors perform better than SIFT. One thing to note is that the detector DET is not only better in terms of repeatability, but generally better in terms of both the NN mAP, which captures the descriptor performance, and in terms of matching score, which evaluates the full pipeline. This shows that the present detector DET learns to find not only points that can be found often but also points that can be matched easily, indicating that training the pipeline as a whole is important for optimal performance.

Figure 7:
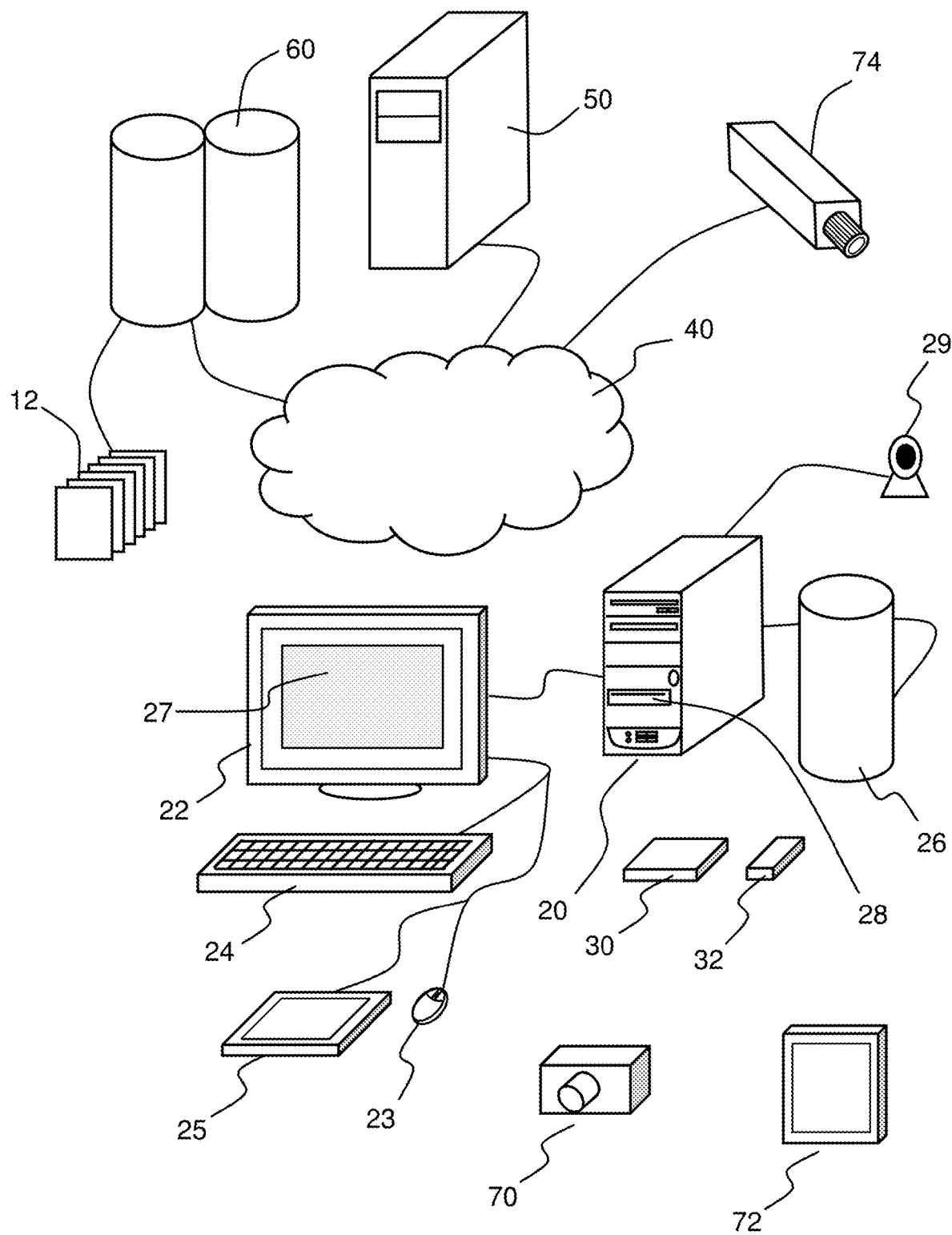
FIG. 7 shows an exemplary computer system that can be used to implement the method described above, according to another aspect of the present invention.

With respect to an exemplary implementation of the runtime architecture for the pipeline that is described with respect to FIG. 4, this architecture can be implemented in a computer system or device, as shown in FIG. 7, to implement the LIFT algorithm, including the Detector (DET), the Orientation Estimator (ORI), and the Descriptor (DESC). The system includes a data processing device 20, for example but not limited to a personal computer (PC), Macintosh™ computer, mainframe computer, laptop, notebook, netbook, data processing workstation, smartphone. A dataset 12 is schematically shown, that can be located locally in a storage 26 associated with processing device 20, or can be accessed via the network 40, for example the Internet, from various remotely located devices, for example servers 50 and storage 60. Dataset 12 can be also generated by a camera 74, or originate from a local memory of camera 71. It is also possible that dataset 12 is generated by a webcam 29 that is operably connected to data processing device 20, or dataset 12 is transferred to data processing device 20 via a camera 70 or from a smartphone or other portable device 72. Dataset 12 can include but is not limited to an image, a series of images, a video sequence. For example, dataset 12 include the Strecha dataset, the DTU dataset, or the Webcam dataset, and other life and recorded video sequences.

Processing device 20 can be equipped with one or several hardware microprocessors, dedicated graphics processors, and with internal memory. Also, processing device 20 is connected to a data input device, for example a keyboard 24 to provide for user instructions for the method, computer mouse 23, or trackpad 25, and a data display device, for example a computer screen 22, to display different stages and final results of the data processing steps of the method. The computer screen can be capable of displaying images and graphical elements to represent results and processing steps of the method. For example, a graphical user interface 27 can be shown, and as an example, images can be shown together with keypoints, indication lines to who correct matches of features, and indicators for showing descriptor support regions. Processing device 20 is also connected to a network 40, for example the Internet, to access various cloud-based and network based services, for example but not limited to cloud or network servers 50, cloud or network data storage devices 60, specific web servers providing databases of graphics data.

The LIFT algorithm, or a method of performing the LIFT algorithm can also be performed on hardware processors of one or more servers 50, and the results sent over the network 40 for rendering and display on computer screen 22 via processing device 20. Processing device 20 can be equipped with a data input/output port, for example a CDROM drive, Universal Serial Bus (USB), card readers, storage device readers, to read data, for example computer readable and executable instructions, from non-transitory computer-readable media 30, 32. Non-transitory computer-readable media 30, 32 are storage devices, for example but not limited to external hard drives, flash drives, memory cards, USB memory sticks, CDROM, Blu-Ray™ disks, optical storage devices and other types of portable memory devices that are capable of temporarily or permanently storing computer-readable instructions thereon. The computer-readable instructions can be configured to perform the LIFT algorithm, and is subroutines, components, data processing, etc. as described above, when loaded to processing device 20 and executed on a processing device 20 or a cloud or other type of network server 50, for example the one shown in FIG. 7.

In sum, with the present method, device and system, a novel deep network architecture has been introduced that combines the three components of standard pipelines for local feature detection and description into a single differentiable network. Spatial transformers can be used together with the softargmax function to mesh them together into a unified network that can be trained end-to-end with backpropagation. While this makes learning the network from scratch theoretically possible, it is not practical. Therefore an elective strategy has been used to train it. The experimental results demonstrate that the herein presented integrated approach outperforms the background art. To further improve performance, strategies can be used that allow us to take advantage even more effectively the ability to train the network as a whole. In particular, hard negative mining strategies will be analyzed over the whole image, for example as shown in reference [45], instead of relying on pre-extracted patches. This has the potential of producing more discriminative filters and, consequently, better descriptors.

According to some aspects of the present invention, a novel deep network architecture for a method has been provided that implements the full feature point handling pipeline, that is, detection, orientation estimation, and feature description. While previous works have successfully tackled each one of these problems individually, herein it is shown how to learn to do all three in a unified manner while preserving end-to-end differentiability. It is also shown that the deep pipeline outperforms background art methods on a number of benchmark datasets, without the need of retraining.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

[1] Lowe, D.: Distinctive Image Features from Scale-Invariant Keypoints. IJCV 20(2) (2004)
[2] Bay, H., Ess, A., Tuytelaars, T., Van Gool, L.: SURF: Speeded Up Robust Features. CVIU 10(3) (2008) 346-359
[3] Tola, E., Lepetit, V., Fua, P.: A Fast Local Descriptor for Dense Matching. In: CVPR. (2008)

[4] Rublee, E., Rabaud, V., Konolidge, K., Bradski, G.: ORB: An Efficient Alternative to SIFT or SURF. In: ICCV. (2011)

[5] Mainali, P., Lafruit, G., Tack, K., Van Gool, L., Lauwereins, R.: Derivative-Based Scale Invariant Image Feature Detector with Error Resilience. TIP 23(5) (2014) 2380-2391

[6] Verdie, Y., Yi, K. M., Fua, P., Lepetit, V.: TILDE: A Temporally Invariant Learned DEtector. In: CVPR. (2015)

[7] Han, X., Leung, T., Jia, Y., Sukthankar, R., Berg, A. C.: MatchNet: Unifying Feature and Metric Learning for Patch-Based Matching. In: CVPR. (2015)

[8] Zagoruyko, S., Komodakis, N.: Learning to Compare Image Patches via Convolutional Neural Networks. In: CVPR. (2015)

[8] Yi, K., Verdie, Y., Lepetit, V., Fua, P.: Learning to Assign Orientations to Feature Points. In: CVPR. (2016)

[10] Simo-Serra, E., Trulls, E., Ferraz, L., Kokkinos, I., Fua, P., Moreno-Noguer, F.: Discriminative Learning of Deep Convolutional Feature Point Descriptors. In: ICCV. (2015)

[11] Jaderberg, M., Simonyan, K., Zisserman, A., Kavukcuoglu, K.: Spatial Transformer Networks. In: NIPS. (2015)

[12] Chapelle, O., Wu, M.: Gradient Descent Optimization of Smoothed Information Retrieval Metrics. Information Retrieval 13(3) (2009) 216-235

[13] Harris, C., Stephens, M.: A Combined Corner and Edge Detector. In: Fourth Alvey Vision Conference. (1988)

[14] Moravec, H.: Obstacle Avoidance and Navigation in the Real World by a Seeing Robot Rover. In: tech. report CMU-RI-TR-80-03, Robotics Institute, Carnegie Mellon University, Stanford University. (September 1980)

[15] Rosten, E., Drummond, T.: Machine Learning for High-Speed Corner Detection. In: ECCV. (2006)

[16] Matas, J., Chum, O., Martin, U., Pajdla, T.: Robust Wide Baseline Stereo from Maximally Stable Extremal Regions. In: BMVC. (September 2002) 384-393

[17] Mikolajczyk, K., Schmid, C.: An Affine Invariant Interest Point Detector. In: ECCV. (2002) 128-142

[18] Förstner, W., Dickscheid, T., Schindler, F.: Detecting Interpretable and Accurate Scale-Invariant Keypoints. In: ICCV. (September 2009)

[19] Zitnick, C., Ramnath, K.: Edge Foci Interest Points. In: ICCV. (2011)

[20] Mainali, P., Lafruit, G., Yang, Q., Geelen, B., Van Gool, L., Lauwereins, R.: SIFER: Scale-Invariant Feature Detector with Error Resilience. IJCV 104(2) (2013) 172-197

[21] Sochman, J., Matas, J.: Learning a Fast Emulator of a Binary Decision Process. In: ACCV. (2007) 236-245

[22] Trujillo, L., Olague, G.: Using Evolution to Learn How to Perform Interest Point Detection. In: ICPR. (2006) 211-214

[23] Strecha, C., Bronstein, A., Bronstein, M., Fua, P.: LDAHash: Improved Matching with Smaller Descriptors. PAMI 34(1) (January 2012)

[24] Winder, S., Brown, M.: Learning Local Image Descriptors. In: CVPR. (June 2007)

[25] Perez, C., Olague, G.: Genetic Programming As Strategy for Learning Image Descriptor Operators. Intelligent Data Analysis 17 (2013) 561-583

[26] Simonyan, K., Vedaldi, A., Zisserman, A.: Learning Local Feature Descriptors Using Convex Optimisation. PAMI (2014)

[27] Zbontar, J., LeCun, Y.: Computing the Stereo Matching Cost with a Convolutional Neural Network. In: CVPR. (2015)

[28] Balntas, V., Johns, E., Tang, L., Mikolajczyk, K.: PN-Net: Conjoined Triple Deep Network for Learning Local Image Descriptors. In: arXiv Preprint. (2016)

[29] Wilson, K., Snavely, N.: Robust Global Translations with 1DSfM. In: ECCV. (2014)

[30] Wu, C.: Towards Linear-Time Incremental Structure from Motion. In: 3DV. (2013)

[31] Paulin, M., Douze, M., Harchaoui, Z., Mairal, J., Perronnin, F., Schmid, C.: Local Convolutional Features with Unsupervised Training for Image Retrieval. In: ICCV. (2015)

[32] Sermanet, P., Chintala, S., LeCun, Y.: Convolutional Neural Networks Applied to House Numbers Digit Classification. In: ICPR. (2012)

[33] Strecha, C., Hansen, W., Van Gool, L., Fua, P., Thoennessen, U.: On Benchmarking Camera Calibration and Multi-View Stereo for High Resolution Imagery. In: CVPR. (2008)

[34] Aanaes, H., Dahl, A. L., Pedersen, K. S.: Interesting Interest Points. IJCV 97 (2012) 18-35

[35] Mikolajczyk, K., Schmid, C.: A Performance Evaluation of Local Descriptors. In: CVPR. (June 2003) 257-263

[36] Alcantarilla, P., Fern´ andez, P., Bartoli, A., Davidson, A. J.: KAZE Features. In: ECCV. (2012)

[37] Tola, E., Lepetit, V., Fua, P.: Daisy: An Efficient Dense Descriptor Applied to Wide Baseline Stereo. PAMI 32(5) (2010) 815-830

[38] Bellavia, F., Tegolo, D.: Improving Sift-Based Descriptors Stability to Rotations. In: ICPR. (2010)

[39] Mikolajczyk, K., Schmid, C.: Scale and Affine Invariant Interest Point Detectors. IJCV 60 (2004) 63-86

[40] Fan, B., Wu, F., Hu, Z.: Aggregating Gradient Distributions into Intensity Orders: A Novel Local Image Descriptor. In: CVPR. (2011)

[41] Wang, Z., Fan, B., Wu, F.: Local Intensity Order Pattern for Feature Description. In: ICCV. (2011)

[42] Zitnick, C.: Binary Coherent Edge Descriptors. In: ECCV. (2010)

[43] Leutenegger, S., Chli, M., Siegwart, R.: BRISK: Binary Robust Invariant Scalable Keypoints. In: ICCV. (2011)

[44] Alahi, A., Ortiz, R., Vandergheynst, P.: FREAK: Fast Retina Keypoint. In: CVPR. (2012)

[45] Felzenszwalb, P., Girshick, R., McAllester, D., Ramanan, D.: Object Detection with Discriminatively Trained Part Based Models. PAMI (2010)

The invention claimed is:

1. A method for training a feature detector of an image processor, the method comprising the steps of:
   detecting features in an image to generate a score map;
   computing a center of mass on the score map to generate a location;
   extracting a patch from the image at the location by a first spatial transformer;
   estimating an orientation of the patch;
   rotating the patch in accordance with the patch orientation with a second spatial transformer; and
   describing the rotated patch to create a description vector,
   wherein in the step of estimating, an orientation estimator is used that estimates the orientation that minimize distances between description vectors for different views of same 3D points.

2. The method according to claim 1, wherein in the step of computing, a softargmax is performed on the score map to generate the location of a single potential feature point of the image.

3. The method according to claim 1, wherein in the step of detecting, a convolution layer is used to generate the score map followed by a piecewise linear activation function.

4. The method according to claim 1, wherein in the step of describing, a descriptor is used that includes three convolutional layers followed by hyperbolic tangent units, 12 pooling, and local subtractive normalization.

5. The method according to claim 4, wherein the descriptor is trained by minimizing a sum of a loss for pairs of corresponding patches of the image, and a loss for pairs of non-corresponding patches.

6. An image processing device having a feature detector that has been trained according to the method of claim 1.

7. An image processing device including a processor and data storage, the image processing device adapted for detecting features in an image, the processor configured to,
  detect features in the image to generate a score map;
  compute a center of mass on the score map to generate a location;
  extract a patch from the image at the location by a first spatial transformer;
  estimate an orientation of the patch;
  rotate the patch in accordance with the patch orientation with a second spatial transformer; and
  describe the rotated patch to create a description vector,
    wherein in the estimating, an orientation estimator is used that estimates the orientation that minimize distances between description vectors for different views of same 3D points.

8. The device according to claim 7, wherein in the computing performed by the processor, a softargmax is calculated on the score map to generate the location of a single potential feature point of the image.

9. The device according to claim 7, wherein in the detecting performed by the processor, a convolution layer is used to generate the score map followed by a piecewise linear activation function.

10. The device according to claim 7, wherein in the describing performed by the processor, a descriptor is used that includes three convolutional layers followed by hyperbolic tangent units, 12 pooling, and local subtractive normalization.

11. The device according to claim 10, wherein the descriptor is trained by minimizing a sum of a loss for pairs of corresponding patches of the image, and a loss for pairs of non-corresponding patches.

12. A non-transitory computer readable medium having computer instructions recorded thereon, the computer instructions configured to perform a method for training a feature detector when executed on a computer, the method comprising the steps of:
  detecting features in an image to generate a score map;
  computing a center of mass on the score map to generate a location;
  extracting a patch from the image at the location by a first spatial transformer;
  estimating an orientation of the patch;
  rotating the patch in accordance with the patch orientation with a second spatial transformer; and
  describing the rotated patch to create a description vector,
    wherein in the estimating, an orientation estimator is used that estimates the orientation that minimize distances between description vectors for different views of same 3D points.

13. The non-transitory computer readable medium according to claim 12, wherein in the step of computing, a softargmax is performed on the score map to generate the location of a single potential feature point of the image.

14. The non-transitory computer readable medium according to claim 12, wherein in the step of detecting, a convolution layer is used to generate the score map followed by a piecewise linear activation function.

15. The non-transitory computer readable medium according to claim 12, wherein in the step of describing, a descriptor is used that includes three convolutional layers followed by hyperbolic tangent units, 12 pooling, and local subtractive normalization.

16. The non-transitory computer readable medium according to claim 15, wherein the descriptor is trained by minimizing a sum of a loss for pairs of corresponding patches of the image, and a loss for pairs of non-corresponding patches.

* * * * *